United States Patent
Pycock et al.

(10) Patent No.: US 9,350,943 B2
(45) Date of Patent: May 24, 2016

(54) VIDEO PICKER

(71) Applicant: Microsoft Technology Licensing, LLC, Redmond, WA (US)

(72) Inventors: James E. Pycock, Cambridge (GB); Daniel James Chastney, Sunnyvale, CA (US); Steve James Pearce, London (GB); Amy Jiyun Kim, San Jose, CA (US); Soramist Chintanamanus, London (GB); Antonio Pedro Pernambuco Rezende, London (GB); Stephanie Mary McNee, London (GB); Eldar A. Markov, Zelenograd (RU)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/486,781

(22) Filed: Sep. 15, 2014

(65) Prior Publication Data

US 2016/0080689 A1    Mar. 17, 2016

(51) Int. Cl.
| | |
|---|---|
| *H04M 7/14* | (2006.01) |
| *H04N 7/14* | (2006.01) |
| *H04L 12/58* | (2006.01) |
| *H04N 7/088* | (2006.01) |

(52) U.S. Cl.
CPC ............. *H04N 7/147* (2013.01); *H04L 51/04* (2013.01); *H04L 51/12* (2013.01); *H04N 7/0882* (2013.01)

(58) Field of Classification Search
CPC ...................................... H04N 7/14
USPC ............ 348/14.01, 14.06, 14.07, 14.03
See application file for complete search history.

(56) References Cited

U.S. PATENT DOCUMENTS

| | | | |
|---|---|---|---|
| 7,813,724 B2 | 10/2010 | Gronner et al. | |
| 8,175,638 B2 | 5/2012 | Cowherd | |
| 8,307,029 B2 | 11/2012 | Davis et al. | |
| 8,576,270 B1 | 11/2013 | Vitale et al. | |
| 2002/0025026 A1* | 2/2002 | Gerszberg | H04M 1/2478 379/67.1 |
| 2003/0041333 A1 | 2/2003 | Allen et al. | |
| 2003/0107589 A1 | 6/2003 | Liu | |
| 2008/0062246 A1 | 3/2008 | Woodworth et al. | |
| 2008/0071875 A1 | 3/2008 | Koff et al. | |
| 2008/0259155 A1 | 10/2008 | McLelland et al. | |
| 2008/0273077 A1* | 11/2008 | Cowherd | H04M 3/5315 348/14.06 |
| 2009/0013048 A1 | 1/2009 | Partaker et al. | |
| 2009/0092234 A1* | 4/2009 | St. Onge | H04L 12/1818 379/88.13 |

(Continued)

FOREIGN PATENT DOCUMENTS

| | | |
|---|---|---|
| CN | 101567945 | 10/2009 |
| WO | WO-2010042103 | 4/2010 |

OTHER PUBLICATIONS

"Glide—Video Texting", Retrieved From: <https://play.google.com/store/apps/details?id=com.glidetalk.glideapp> Sep. 23, 2014, Aug. 11, 2014, 2 pages.

(Continued)

*Primary Examiner* — Olisa Anwah
(74) *Attorney, Agent, or Firm* — Tom Wong; Micky Minhas

(57) ABSTRACT

There is provided a method comprising: receiving at a first device a first video; receiving at the first device an indication that the first video was selected by a user of a second device from a set of pre-recorded videos; and causing the first video to be displayed, via a display, in conjunction with an indication that the first video was selected by the user of the second device from a set of pre-recorded videos.

20 Claims, 3 Drawing Sheets

(56) References Cited

U.S. PATENT DOCUMENTS

| | | |
|---|---|---|
| 2009/0156170 A1 | 6/2009 | Rossano et al. |
| 2011/0319104 A1 | 12/2011 | Williams |
| 2012/0044318 A1 | 2/2012 | Xue |
| 2013/0044179 A1* | 2/2013 | Peng .................. H04M 1/6505 348/14.06 |

OTHER PUBLICATIONS

"Vonage Mobile—Voice, Text, and Video", Retrieved From: <https://itunes.apple.com/in/app/vonage-mobile-voice-text-video/id491391564?mt=8> Sep. 23, 2014, Jul. 31, 2014, 3 pages.

"myChat Now on Windows Phone", Retrieved From: <http://blog.my.com/mychat-now-on-windows-phone/> Sep. 9, 2014, Jul. 8, 2014, 3 pages.

WAHID, "How to Send Skype Video Messages Using Skype App for Windows 8/RT", Retrieved From: <http://www.windows8core.com/how-to-send-skype-video-messages-using-skype-app-for-windows-8rt/> Sep. 23, 2014, May 8, 2013, 3 pages.

International Search Report and Written Opinion, Application No. PCT/US2015/049875, Nov. 25, 2015, 12 pages.

\* cited by examiner

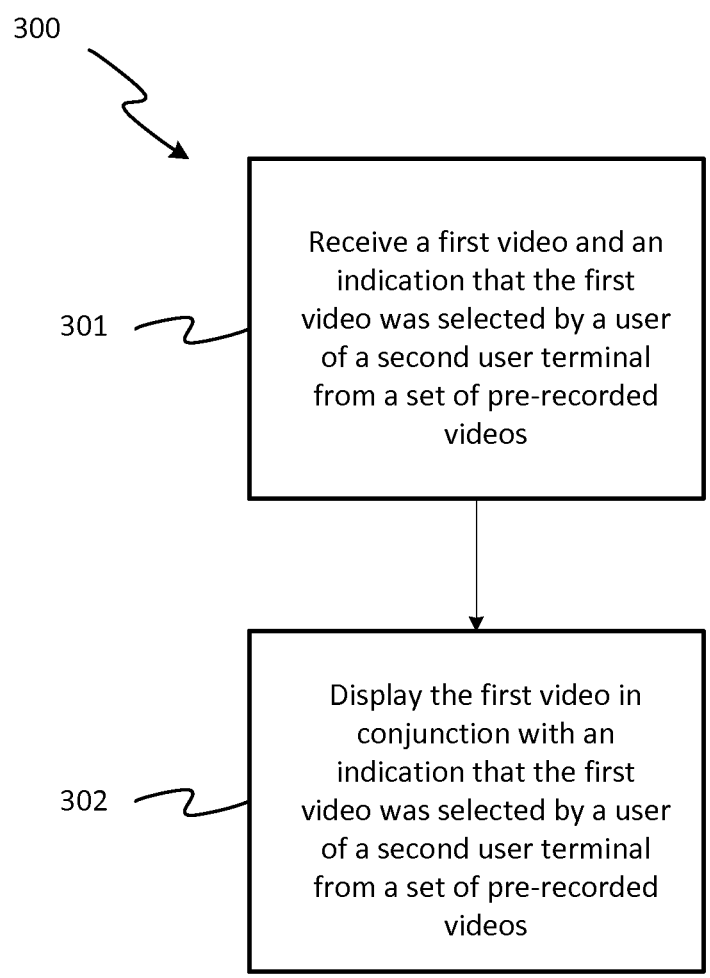

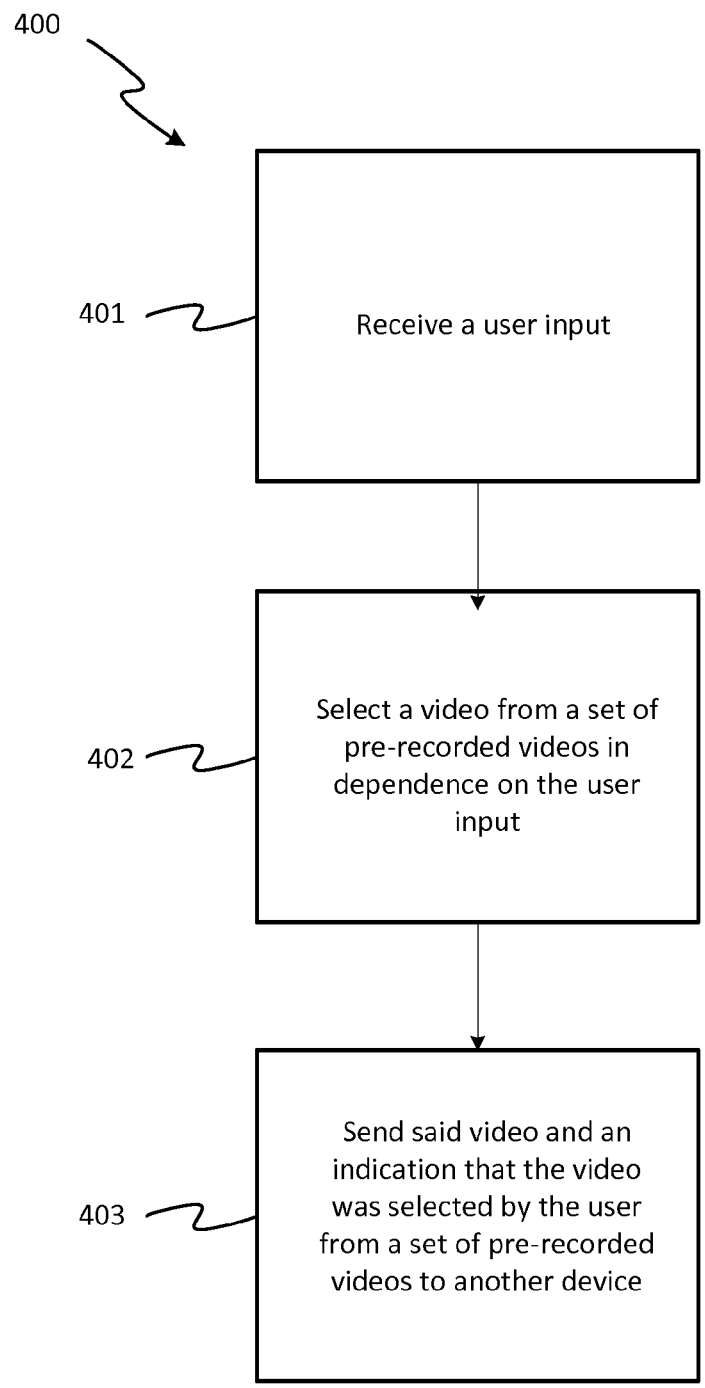

VIDEO PICKER

BACKGROUND

Various communication services exist that enable users to establish private conversations between them, over a network such as the Internet. Examples include IM (instant messaging) chat services, VoIP (Voice over Internet Protocol) services, picture messaging services, video messaging services and/or voice messaging services. In an IM chat conversation for example, a user can send a textual message to the one or more other users involved in the conversation. In a VoIP conversation (a call), a user can stream live voice and/or video to the other users in the conversation. In a picture messaging conversation, a user can send a still image to the other users in the conversation, while in a video messaging conversation a user can send a video clip, and in a voice messaging conversation a user can leave a (non-live) voice clip.

VoIP communications continue to evolve and can provide a desirable and efficient way for parties to communicate with one another. In particular, VoIP calls that include a video element in which calling parties see one another can provide an intimate and desirable experience.

VoIP communications continue to have barriers that affect the extent to which many users engage with them. For example, consider the case where a video communication is desired using, for example, VoIP. In order to have such a video communication, both parties in a video communication are typically on the line at the same time. This can present problems particularly across varying time zones. In addition, video communications using VoIP generally need high-end computing devices with fairly high bandwidth network connections. Even if these challenges are met, there still may be problems in connecting video calls and sustaining the calls for any period of time.

Further, in communication applications in which the only modality is video-based communications, or when a user prefers using video-based communications, occasions may arise when a user has received a video message or has been unable to answer a video call and wishes to reply with a video-based response. However, the user may be in a situation or environment in which they are unable or uncomfortable in responding using video recorded in that situation or environment. For example, the user might be in a public place, in a meeting, in a noisy environment, on public transport, or in an environment that has low light levels and is currently unsuitable for capturing video. Equally, a user may wish to acknowledge, respond and/or pass comment on a received video but be unable to quickly think of something creative enough to record as a video message or not have sufficiently interesting surrounding content to record as a unique new video message and send as a response.

Other communication and social network services have created lightweight ways for users to quickly acknowledge and respond to other users' messages or posts. For example, emoticons such as smileys, (bowing) or (star) are often used. These responses are "ready-made", usually graphical, responses offered by the application, which the user can selectively and manually use to acknowledge, confirm and/or approve of messages. They differ from read receipts which are automatically applied by the system and applied equally to all messages, for example, by virtue of the user opening the application and/or the conversation involved.

SUMMARY

It would be useful to have video messages that may function as emoticons (or the like) in video messaging. This may be achieved using pre-recorded video responses.

Where the concept of using pre-recorded video responses is applied, it would be useful to indicate whether or not a particular video is a pre-recorded video to the recipient of the message to avoid confusion. For example, a pre-recorded video response might make it appear that the person (or user) sending the video response is at work, despite it being a weekend when the user is really at home.

This Summary is provided to introduce a selection of concepts in a simplified form that are further described below in the Detailed Description. This Summary is not intended to identify key features of the claimed subject matter.

According to one aspect disclosed herein, there is provided a method comprising: receiving at a first device a first video; receiving at the first device an indication that the first video was selected by a user of a second device from a set of pre-recorded videos; and causing the first video to be displayed, via a display, in conjunction with an indication that the first video was selected by the user of the second device from a set of pre-recorded videos.

According to another aspect, there is provided a method comprising: receiving an input from a user; selecting a video from a set of pre-recorded videos in dependence on the input; and sending said video and an indication that said video was selected from a set of pre-recorded videos by the user to another device.

By displaying the first video in conjunction with an indication that the first video was selected by the user of the second device from a set of pre-recorded videos, a user of the first device is presented with a visual indication that the first video was not recorded "on-the-fly" in response to the most recently sent communication in a video-based conversation. Thus the likelihood of confusion for a user of the first user terminal is diminished in comparison to schemes that do not use such a visual indication.

BRIEF DESCRIPTION OF THE FIGURES

To assist understanding of the present disclosure and to show how embodiments may be put into effect, reference will be made by way of example to the accompanying drawings in which:

FIG. 3 is a schematic illustration of a process undertaken by a user terminal, and FIG. 4 is a schematic illustration of a process undertaken by a user terminal.

DETAILED DESCRIPTION

The following discloses a scheme whereby video messages are each displayed to a user differently depending on whether or not they were respectively selected from a library comprising multiple pre-recorded messages. A particular application of such a scheme is where the library of pre-recorded messages relate to standard emotions, such as a smiley-face, angry-face, laughing-face, crying-face, etc. These may be used in a similar way to the way in which emoticons are used in text-based conversations i.e. to convey an emotional reaction of the responding user. It is understood that audio data, in addition to image data, may form part of the video data.

Figure 1:
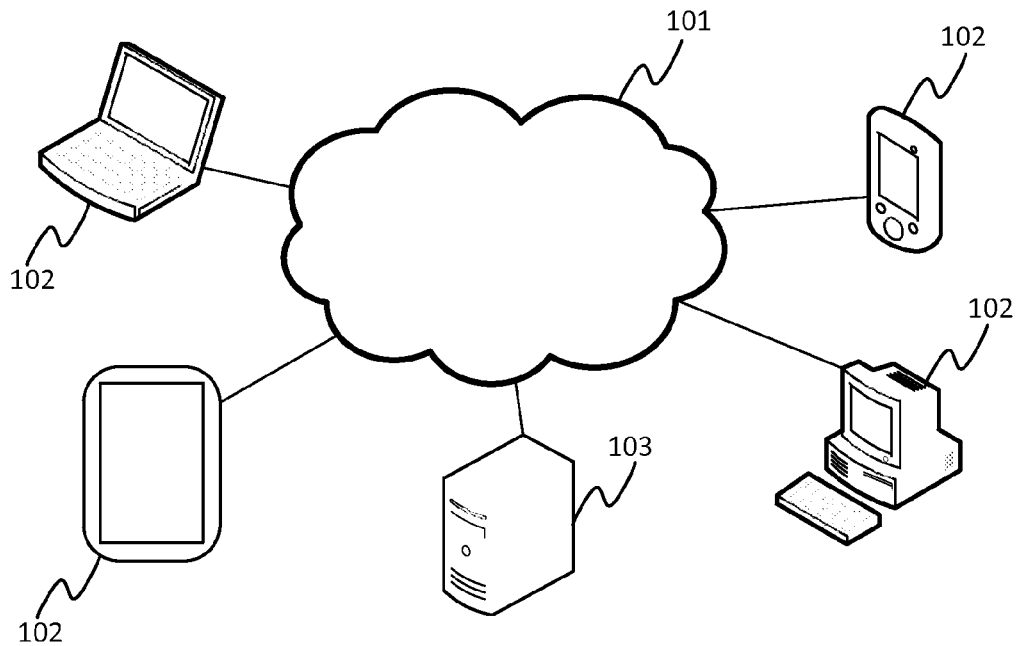
FIG. 1 is a schematic diagram of a communication system.

FIG. 1 shows an example of a communication system in which the teachings of the present disclosure may be implemented. The system comprises a communication medium 101, in embodiments a communication network such as a packet-based network, for example comprising the Internet and/or a mobile cellular network (e.g. 3GPP network). The system further comprises a plurality of user terminals 102, each operable to connect to the network 101 via a wired and/or wireless connection. For example, each of the user terminals may comprise a smartphone, tablet, laptop computer or desktop computer. In embodiments, the system also comprises a server 103 connected to the network 101. The term server as used herein refers to a logical server, which may comprise one or more physical server units at one or more physical sites (i.e. the server 103 may or may not be distributed over multiple different geographic locations).

Figure 2:
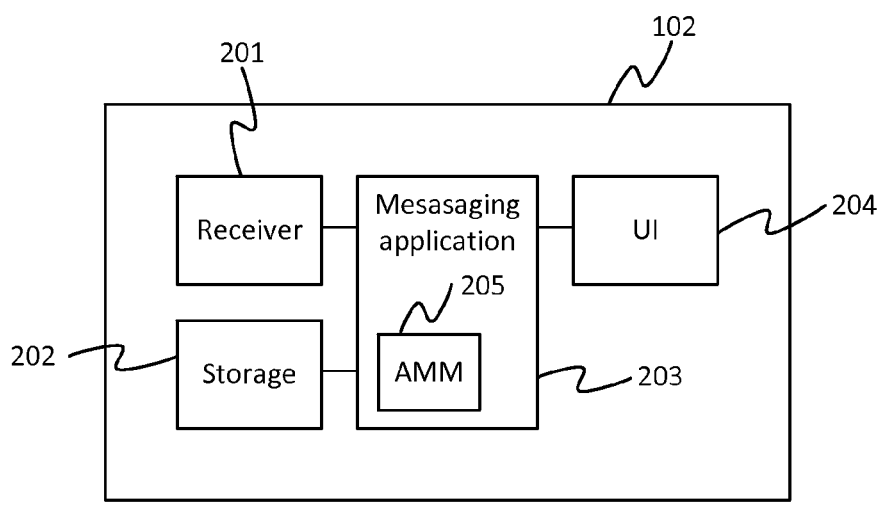
FIG. 2 is a schematic block diagram of a user terminal.

FIG. 2 shows an example of one of the user terminals 102 in accordance with embodiments disclosed herein. The user terminal 102 comprises a receiver 201 for receiving data from one or more others of the user terminals 102 over the communication medium 101, e.g. a network interface such as a wired or wireless modem for receiving data over the Internet or a 3GPP network. The user terminal 102 also comprises a non-volatile storage 202, i.e. non-volatile memory, comprising one or more internal or external non-volatile storage devices such as one or more hard-drives and/or one or more EEPROMs (sometimes also called flash memory). Further, the user terminal comprises a user interface 204 comprising at least one output to the user, e.g. a display such as a screen, and/or an audio output such as a speaker or headphone socket. The user interface 204 will typically also comprise at least one user input allowing a user to control the user terminal 102, for example a touch-screen, keyboard and/or mouse input.

Furthermore, the user terminal 102 comprises a messaging application 203, which is configured to receive messages from a complementary instance of the messaging application on another of the user terminals 102, or the server 103 (in which cases the messages may originate from a sending user terminal sending the messages via the server 103, and/or may originate from the server 103). For example, the messaging application may allow users to leave video messages, e.g. a "talking head" video message captured from a front-facing camera of the sending user terminal, or a video message sharing a scene captured from a rear-facing camera of the sending user terminal. The present disclosure is particularly useful in the case of video messages which tend to incur the most storage. Video messages can include videos captured by a camera, animations, and/or screen sharing recordings.

The messaging application is configured to receive the messages over the network 101 (or more generally the communication medium) via the receiver 201, and to store the received messages in the storage 202. For the purpose of the following discussion, the described user terminal 102 will be considered as the receiving (destination) user terminal, receiving the messages from one or more other, sending ones of the user terminals 102. However, it will be appreciated that the messaging application 203 receiving user terminal 102 and may also be able to send messages in the other direction to the complementary instances of the application on the sending user terminals and/or server 103 (e.g. as part of the same conversation), also over the network 101 or other such communication medium.

The receiving messaging application 203 is configured to output, to the user via the user interface 204, an indication that the messages have been received and are currently stored in the storage 202, e.g. by displaying a respective indication such as an icon representing each received messages. The indications may be displayed in a panel of the display in some convenient order such as chronological order from oldest to newest, e.g. in terms of time since receipt by the messaging application, or time since creation or sending by the sending application on the sending user terminal, or time since sent by the server.

The messaging application 203 is also configured to play out the content of messages themselves via the user interface 204, i.e. play out the video of a video message via a screen, and/or play out the audio of a video message via a speaker or headphones. In embodiments, the user is able to select one of the indications of the messages (e.g. message icons) displayed a screen or other display of the user interface 204, and in response the messaging application plays out the content of the corresponding selected message.

In embodiments, the messaging application is configured to display the indications of the messages on a per conversation basis, i.e. with the indications grouped into conversations such that all of the presently received, stored messages of a given conversation are grouped together on the display of the user interface 204 (and if more than one conversation is present the indications of each conversation will be grouped together into different respective groups within the user interface 204). N.B. this doesn't mean all the presently received, stored messages of a given conversation have to be visible on the display at once, e.g. the user may have to scroll through a conversation to see all the indications.

The concept of a conversation is itself well understood in the field of messaging applications. A conversation is a logical thread of content, arranged under the same conversation ID used by the messaging application (though the users need not be aware of the ID). Following the first message of a conversation, each subsequent message is deemed part of the same conversation as it is entered as such by the sending user in a part of the user interface of his or her messaging application which represents the conversation in question. The subsequent message is typically a response to or relates to a preceding message of the conversation, though potentially a user could send a completely unrelated message as part of the same conversation. A given conversation typically involves some or all of the same users, but users can leave a conversation and new users can join (usually only with permission from one or more existing users). Also different conversations can be formed form the same users.

Now, a particular embodiment will be described with reference to FIG. 3.

Process 300 indicates a process that may be performed by a first user terminal 102, such as the one described above. At 301, the first user terminal receives a first video and an indication that the first video was selected by a user of a second user terminal from a set of pre-recorded videos. At 302, the first user terminal displays, via a display, the first video in conjunction with an indication that the first video was selected by the user of the second user terminal from a set of pre-recorded videos.

The first video is displayed in conjunction with an indication that the first video was selected by the user of the second user terminal from a set of pre-recorded videos. By this, it is meant that the first user terminal comprises, or is operationally connected to, a display suitable for displaying both the first video and the indication. Further the display is such as to present an indication of the type of video the first video is i.e. that it is a "stock" video response. The term "stock" video is intended to cover both videos comprising third party content as well as content pre-recorded by a user i.e. user generated content.

The first video may be displayed in conjunction with indication that the first video was selected by the user of the second user terminal from a set of pre-recorded videos by displaying the first video and the indication simultaneously. However, it is understood that the indication could be provided before, during and/or after the first video has played. In general, embodiments in which the indication is displayed for the entire duration that the first video is playing are good at relieving potential confusion of a user of the first user terminal, as the likelihood of a user not seeing the indication is reduced.

The first video may be an entire video file or only a portion thereof. For instance, a portion of the video file from which the first video is accessible may be blotted out on the display by the superposition of the indication over the video file. In this instance, the first video and the indication are displayed simultaneously on the display, at least temporarily.

The indication that the first video was selected by the user of the second user terminal may be provided in a number of forms. For example, this could be indicated by using a flag inserted in an appropriate protocol layer in the communication. For example, the flag may be comprised within a header (or body) of an application layer message. The indication is only provided when the first video is selected from a set of pre-recorded videos. Thus no indication is provided when the first video is not selected from a set of pre-recorded videos. For example, in one system, the application utilises a "stop-recording-and-send" command to direct the most immediately recorded video to a particular user/conversation. In such a system, the video sent would not be selected from a set of pre-recorded videos and so would not be provided with an indication that it was. Consequently, such a video would not be displayed in conjunction with an indication that it was selected from a set of pre-recorded videos. Commonly, it is expected that the set of pre-recorded videos forms part of a digital library of the second user terminal from which the user of that second user terminal may select the first video (as described below).

The method may further comprise, at the first user terminal, applying a mask to the first video such that only a portion of the first video is displayed via the display, wherein the indication that the first video was selected by the user of the second user terminal from a set of pre-recorded videos is provided by the omission of said portion. In other words, the first video is received as part of a larger video having a larger video area and the method further comprises obtaining the first video for display by applying, at the first device, a mask to the larger video area so as to omit a portion of the larger video area, wherein the indication that the first video was selected by the user of the second device from a set of pre-recorded videos is provided by the omission of said portion on the display. In this case, the indication displayed to the user is considered to be provided by the borders of the displayed first video.

The first video is the part of the video file from which the first video originates that is actually displayed via the display of the first user terminal. Thus, when a mask is applied to that video file, only the first video results. The mask may be a circular mask. In this case applying the circular mask to the identified video results in the corners of the identified video being omitted from being displayed via a display of the first user terminal. Instead, a circular video image is played out. It has been found that a circular mask is particularly useful when playing out video files as it focuses the attention of the user of the first terminal onto the first video being played out more effectively than masks of other shapes.

Where the mask is a circular mask, it may be centred on either the central portion of the first video or on an object identified in the first video. The object may be identified by either the first user terminal or the second user terminal. For example, where the first video is to be applied with a circular mask centred on the central portion of the first video, the first video displayed via the display has a circular shape that is spatially centred on the corresponding spatial-centre-point of the first video. Where the first video is to be applied with a circular mask centred on an object identified in the first video by the first user terminal, the first video displayed via the display has a circular shape that is spatially centred on the corresponding spatial-centre-point of that identified object. This identified object may be determined using an automatic algorithm (such as, for example, to detect a face in the video). Alternatively or in addition, the identified object may be determined by a selection of a user of either the first or second user terminals.

Alternatively or in addition to the processes outlined above, the indication that the first video was selected by the user of the second user terminal from a set of pre-recorded videos located at the second user terminal may be indicated by at least one of a plurality of processing tools that renders a visual effect or change in the video itself. For example, a filter-based processing procedure may be applied to the first video prior to displaying the processed video in order to apply a particular image-based effect, such as grey-scale, blue-scale, negative, etc. These are types of processing tools that effect a visual effect into the displayed image that can be used by a viewer of such an image to make a determination about the type of video it is i.e. a pre-recorded stock response or an "on-the-fly" recording.

The communications-based application may comprise configurable settings to allow a user to customise how the indication is displayed to the user on the first video. Alternatively, the use of a particular indication-type may be preconfigured into the communications-based application without the opportunity for a user to modify it.

In one embodiment, the indication that the first video was selected by the user of the second user terminal from a set of pre-recorded videos is only displayed in conjunction with the first video when the first video is being played. In this manner, where a conversation in the application environment comprises a mixture of such "stock" videos and videos that were not selected by a user of the second user terminal from amongst a set of pre-recorded videos, the user of the first terminal will be unlikely to avoid looking at a "stock" videos when the stock video is received, as s/he will only realise that such data is "stock" whilst it is being played. This makes for a more realistic interactive user experience.

Thus it is apparent that the first user terminal may also receive a second video without an indication that the second video was selected by a user of a second user terminal from a set of pre-recorded videos. The communication application on the first user terminal is configured to cause the first and second video to be displayed in the order in which they are received. Furthermore, in a conversation pane comprising representations of the video messages exchanged in a conversation, there is no distinction between the two types of video. This is to prevent the likelihood of a user skipping one of the video types (i.e. those marked as originating from when reviewing the conversations.

As mentioned above, the first video may be received from a server device. In this case, prior to receiving the first video, the first user terminal may first receive an identifier from the second user terminal that may be used to retrieve the first video from the server device. Alternatively, the first video may be received from the second user terminal without first transmitting an identifier. The advantage of using an identifier to retrieve a video from a server is that it minimises the amount of bandwidth used for transmitting messages (as each of the set of pre-recorded videos only need to be uploaded to a server once and an identifier is unlikely to consume as much bandwidth as a video transmission).

The first video may have a relatively short play-out time. For example, the play-out time in real time (i.e. at the normal recorded speed) may be less than 10 seconds. In an embodiment, the play-out time is no more than 5 seconds in real time. Ensuring that the play-out times are short allows relieves the memory burden on the user terminals.

The communication may also comprise a text-based label for the first video. The text-based label may describe what is happening in the first video, identify an object in the first video and/or indicate an emotion being expressed by the first video. For example, the first video may be a video of a person pretending to be angry. In this case, the first video may be labelled as "angry". At least part of the text-based label may be displayed to the user of the first user terminal via the display.

There are also described processes undertaken by a transmitter of the first video. This is described below in relation to FIG. 4. In this Figure, the process 400 starts at 401, where an input is received from a user of a user terminal. This input indicates a selection made by the user of a video from a set of pre-recorded videos. As mentioned above, this selection may be performed from a library or catalogue of pre-recorded videos accessible to the user terminal. The video may be selected from an online source and/or from a locally stored video library. The set of pre-recorded videos is accessible from within the same application as the video-messaging communication functions used to subsequently send the video.

At 402, the user terminal is configured to select a video from a set of pre-recorded videos in dependence on the input received from the user.

Finally, at 403 the user terminal sends the video and an indication that the video was selected from a set of pre-recorded videos by the user to another device.

Sending the video may comprise explicitly transmitting the video file comprising the video. Alternatively, sending the video may comprise explicitly transmitting an identifier of the video file i.e. without transmitting the video file itself. The latter case is useful in reducing the bandwidth used for transmissions compared to cases in which the video file itself is transmitted. As mentioned above, such an identifier may be used by a corresponding receiver to retrieve the identified video from a server, such as the Cloud.

It would be useful in the selecting step to make it easy for a user to determine what is in a video file before they select that video. In one embodiment, the communication application is configured to display the set of pre-recorded videos to the user and to cause the videos to be played such that only one video plays at any one time. In another embodiment, the communication application is configured to display and play the set of pre-recorded videos to the user such that multiple videos play simultaneously. This may be configured such that all of the videos are displayed to the user via a display screen of the user terminal and any of those videos currently in view may play when they are fully loaded and in view on the display screen. It is understood that the set of pre-recorded videos may be configured to play such that one video file may start to play a predetermined time after a preceding video file, regardless of whether or not the preceding video file has finished playing. In both of these embodiments, it may be useful for any video(s) playing during the selecting step to be displayed in a similar way to the way in which they are likely to be displayed by the receiver. For example, if the receiver were to identify a video marked as being selected from a set of pre-recorded videos by applying a circular mark to that video when that video is displayed, the transmitter of that video may also play-out that video with an applied circular mask during the selecting step. It may also be useful for any icon used to display a video to the user during the selecting step to be displayed in a similar way to the way in which the video is likely to be displayed by the receiver. For example, if the receiver were to identify a video marked as being selected from a set of pre-recorded videos by applying a circular mark to that video when that video is displayed, the transmitter of that video may also display an icon of that video with an applied circular mask during the selecting step. These processes allow a user to determine more exactly what the receiver user is likely to see, thereby facilitating the selection process.

As mentioned above, the user can access the library comprising the set of pre-recorded videos from within the same communication environment that the conversation is being conducted in. Thus the user does not leave exit the communication application in order to select and send the first video from the set of pre-recorded videos. In other words, the steps outlined above in relation to FIG. 4 are all performed within the same application environment. Further, the communication application used for sending and reading communications in a video-based conversation is also used these steps of FIG. 4 i.e. the steps outlined above in relation to FIGS. 3 and 4 may be executed within the same application environment.

In an embodiment, any audio data associated with the set of pre-recorded videos is not played-out during the selecting step. This makes the selecting stage more user friendly as it is easier for the user to focus on what is happening in the video to determine exactly what he is selecting.

As in the receiver case described above, the video may comprise a text-based label. These are usable as described above.

As mentioned above, the set of pre-recorded videos may include at least one of; content generated by a user at the user terminal; and/or content downloaded from a source external to the user terminal, such as the internet. In one embodiment, the content generated by the user at the user terminal may be recorded or otherwise originate from within the communication application. However, it is understood that the content generated by the user may originate from other applications running on the user terminal and may be imported into the library within the communication application following receipt of such an instruction by a user.

As in the above receiver, each of the set of pre-recorded videos has a play-out time of no more than 10 seconds in real time. In one embodiment, the play-out time is no more than 5 seconds.

Although in the above described embodiments, it is the receiving user terminal that applies a mask (or otherwise processes the received video data to render a visual indication therein), it is understood that the visual indication could already be embedded in the received first video by a transmitter of the first video. However, it is advantageous that this process be applied by the receiving user terminal as the receiving user terminal has a more thorough understanding of the graphical capabilities that can be rendered through its processing and its display of the first video and the indication.

Each of the processes described above in relation to FIGS. 3 and 4 may be embodied in respective computer code residing in memory associated with a respective terminal. When executed on a processor, such computer code causes the process steps outlined above to be performed.

Generally, any of the functions described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

For example, the user terminals may also include an entity (e.g. software) that causes hardware of the user terminals to perform operations, e.g., processors functional blocks, and so on. For example, the user terminals may include a computer-readable medium that may be configured to maintain instructions that cause the user terminals, and more particularly the operating system and associated hardware of the user terminals to perform operations. Thus, the instructions function to configure the operating system and associated hardware to perform the operations and in this way result in transformation of the operating system and associated hardware to perform functions. The instructions may be provided by the computer-readable medium to the user terminals through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

Although the subject matter has been described in language specific to structural features and/or methodological acts, it is to be understood that the subject matter defined in the appended claims is not limited to the specific features or acts described above. Rather, the specific features and acts described above are disclosed as example forms of implementing the claims.

The invention claimed is:

1. A method comprising:
receiving a video at a first device;
receiving at the first device an indication that the video was selected by a user of a second device from a set of pre-recorded videos; and
causing the video to be displayed, via a display, in conjunction with an indication that the video was selected by the user of the second device from a set of pre-recorded videos.

2. A method as claimed in claim 1, wherein the video is received as part of a larger video having a larger video area and the method further comprises obtaining the video for display by applying, at the first device, a mask to the larger video area so as to omit a portion of the larger video area, wherein the indication that the video was selected by the user of the second device from a set of pre-recorded videos is provided by the omission of said portion on the display.

3. A method as claimed in claim 2, wherein the mask is a circular mask centred on either the central portion of the larger video area or on an object identified in the video by the first device.

4. A method as claimed in claim 1, further comprising applying, at the first device, filter-based processing to the video prior to displaying a processed video, wherein the indication that the video was selected by the user of the second device from a set of pre-recorded videos is provided by the filter-based processing.

5. A method as claimed in claim 1, wherein the video is displayed, via the display, simultaneously with said indication that the video was selected by the user of the second device from a set of pre-recorded videos.

6. A method as claimed in claim 1, wherein said indication that the video was selected by the user of the second device from a set of pre-recorded videos is only displayed with the video when the video is being played.

7. A method as claimed in claim 1, further comprising receiving an identifier of the video and using said identifier to retrieve the video from a server.

8. A method as claimed in claim 1, wherein the video and said indication are received in a same communication.

9. A method as claimed in claim 1, wherein the video has a play-out time of no more than five seconds in real time.

10. A method as claimed in claim 1, wherein the communication comprises a text-based label for the video, and the method further comprises displaying at least part of the text-based label to the user of the first device.

11. A method comprising:
receiving an input from a user;
selecting a video from a set of pre-recorded videos in dependence on the input; and
sending said video and an indication that said video was selected by the user from a set of pre-recorded videos to another device.

12. A method as claimed in claim 11, further comprising, in the selecting step:
displaying the set of pre-recorded videos to the user such that only one video plays at any one time.

13. A method as claimed in claim 11, further comprising, in the selecting step:
displaying the set of pre-recorded videos to the user such that multiple video plays simultaneously.

14. A method as claimed in claim 11, wherein sending said video comprises transmitting an identifier of said video for use in retrieving said video from a server.

15. A method as claimed in claim 11, wherein during the selecting step, audio data associated with the set of pre-recorded videos is not played-out.

16. A method as claimed in claim 11, wherein the video comprises a text-based identifier.

17. A method as claimed in claim 11, wherein the set of pre-recorded videos includes at least one of content generated by a user at the device or content downloaded from a source external to the device.

18. A method as claimed in claim 11, wherein each of the set of pre-recorded videos has a play-out time of no more than five seconds in real time.

19. A method as claimed in claim 11, wherein the receiving, selecting and sending are all performed within a same application environment.

20. A computing device comprising:
a display device;
one or more processors; and
one or more computer-readable storage medium storing instructions that are executable by the one or more processors to cause the one or more processors to perform operations including:
receiving a video;
receiving an indication that the received video was selected by a user of a remote device from a set of pre-recorded videos; and causing the received video to be displayed, via the display device, in conjunction with an indication that the received video was selected by the user of the remote device from a set of pre-recorded videos.

* * * * *